United States Patent
Yamada et al.

[11] 3,891,879
[45] June 24, 1975

[54] ROTOR FOR A HYSTERESIS MOTOR

[75] Inventors: Keiko Yamada; Kimiyuki Kamino; Toshiro Kubota, all of Tokyo, Japan

[73] Assignees: Mitsubishi Seiko Kabushiki Kaishi, Tokyo; Kyoei Denshi Kogyo Kabushiki Kaisha, Honjyo, both of Japan

[22] Filed: June 25, 1974

[21] Appl. No.: 483,003

[52] U.S. Cl. ............... 310/163; 310/43; 310/44; 310/45; 310/156; 310/261; 335/303
[51] Int. Cl. ............... H02k 19/08; H02k 21/46
[58] Field of Search ... 310/43, 44, 45, 46, 162–164, 310/156, 152, 261; 335/303

[56] References Cited
UNITED STATES PATENTS

| | | | |
|---|---|---|---|
| 2,468,295 | 4/1949 | Hush | 310/163 |
| 2,834,895 | 5/1958 | Papst | 310/44 |
| 3,024,392 | 3/1962 | Baermann | 335/303 |
| 3,231,770 | 1/1966 | Hyde | 310/156 |
| 3,317,766 | 5/1967 | Bensa | 310/156 X |
| 3,524,092 | 8/1970 | Miyazaki et al. | 310/163 |
| 3,539,845 | 11/1970 | Stcherbatcheft | 310/156 X |
| 3,561,833 | 2/1971 | Heilmann et al. | 310/162 X |
| 3,728,786 | 4/1973 | Lucas et al. | 310/261 X |

Primary Examiner—Donovan E. Duggan
Attorney, Agent, or Firm—Wenderoth, Lind & Ponack

[57] ABSTRACT

A rotor for a hysteresis motor comprises a laminated core having a cage winding, a sheet-like flexible plastic magnetic material secured to the outer periphery of said core without being magnetized, and a filler adhesive secured to the outer surface of said plastic magnetic material, said plastic magnetic material being anisotropic in the direction of the sheet thickness and having such magnetic properties as not less than 2.2 KG residual magnetic flux density Br, not less than 1.2KOe coercive force $_BH_c$, not less than 1.1 MGOe maximum magnetic energy product (BH)max and not greater than 4 KOe minimum intensity of magnetic field necessary for saturation, said plastic magnetic material further having a knee point in its hysteresis loop located in the second quadrant of the B-H diagram, and said filler adhesive being a mixture of powders of a material having high magnetic permeability and a synthetic resin. Alternatively a hollow cylindrical core with a cage winding may be disposed outside a cylindrical core with the interposition of the sheet-like flexible plastic magnetic material having the same magnetic properties.

2 Claims, 3 Drawing Figures

ROTOR FOR A HYSTERESIS MOTOR

BACKGROUND OF THE INVENTION

The present invention relates to a rotor for a motor, and more particularly to a rotor for a hysteresis motor.

The magnetic materials conventionally used for a rotor of a hysteresis motor are isotropic and their coercive force is generally of the order of about 200 Oe at the highest, whereby such materials are made ring-shaped to be mounted around the outer periphery of a core of a rotor made of nonmagnetic material so that a rotor for a hysteresis motor is completed. When such a rotor is used for a hysteresis motor, the magnetic flux flows along a circular path through the ring-shaped magnetic materials. Therefore such magnetic materials are also referred to as hysteresis materials of a so-called circular path magnetic flux type. The principal reason why such hysteresis materials of the circular path magnetic flux type have been hitherto used for the rotor of a hysteresis motor resides in that in order to decrease the reduction in torque of the rotor due to hysteresis loss by a minor loop caused by the slots of the stator, eddy current loss by a local eddy current, etc. the magnetic fluxes issued from the respective teeth of the stator must be integrated in the circumferential direction so that a harmonic magnetic field in the magnetic materials is reduced.

However, the reduction in torque of the rotor of a hysteresis motor due to hysteresis loss, eddy current loss, etc. as above-mentioned is not compensated satisfactorily by the use of the conventional hysteresis materials of the circular path magnetic flux type so that is has been found difficult to manufacture a hysteresis motor having a definite torque and yet with a comparatively small dimension.

Another drawback of the conventional hysteresis motor of the above-mentioned type lies in the difficulty in controlling a starting torque and a synchronous torque independently.

SUMMARY OF THE INVENTION

It is an object of the present invention to provide a rotor for a hysteresis motor in which the hysteresis loss due to a minor loop caused by the slots of the stator of the hysteresis motor, the eddy current loss due to local eddy currents, etc. are remarkably reduced.

It is another object of the present invention to provide a rotor for a hysteresis motor which can increase the starting torque of the motor.

It is a further object of the present invention to provide a rotor for a hysteresis motor which can increase the efficiency of the motor so that a definite output can be obtained with a motor having a relatively small overall dimension.

It is a still further object of the present invention to provide a rotor for a hysteresis motor which makes it possible to independently control either the starting torque or the synchronous torque of the motor as desired.

A rotor for a hysteresis motor according to the present invention comprises a cylindrical laminated core of silicon steel plates having cage windings, a sheet-like flexible plastic magnetic material secured to the outer periphery of said core without being magnetized and a layer of a filler adhesive coated on the outer periphery of said plastic magnetic material, said plastic magnetic material being anisotropic in the thickness direction of the sheet and having such magnetic properties as not less than 2.2 KG residual magnetic flux density Br, not less than 1.2 KOe coercive force $_BH_C$ and not less than 1.1 MGOe maximum magnetic energy product (BH)max, said plastic magnetic material further having a knee point in its hysteresis loop located in the second quadrant of a magnetic flux density-intensity of magnetic field diagram (hereinafter referred to as a "B-H diagram") and further having a value not greater than 4 KOe minimum intensity of magnetic field necessary for saturation Hs, and said filler adhesive being a mixture of powders having high magnetic permeability such as iron powders and synthetic resins.

The present invention contemplates application also to a hysteresis motor that comprises a cylindrical laminated core of silicon steel plates and a hollow cylindrical laminated core of silicon steel plates having a cage winding secured to the outer periphery of said cylindrical core. In this case a sheet-like flexible plastic magnetic material having identical magnetic properties to the one above-mentioned is interposed, without being magnetized, between said cylindrical core and said hollow cylindrical laminated core having a cage winding.

BRIEF DESCRIPTION OF THE DRAWINGS

These and other objects of this invention will become more readily apparent from the following description taken in connection with the accompanying drawings, in which.

DESCRIPTION OF THE PREFERRED EMBODIMENTS

Recently the inventors of the present application had carried out experiments into the possibility of using anisotropic ferrite as a magnetic material for a rotor of a hysteresis motor taking note of the insubstantial area of its minor loop and the largeness of its specific resistance, as a result of which they were able to confirm that a rotor using such anisotropic ferrite gave a large synchronous torque. However, at the same time they also found it was defective in that, since such anisotropic ferrite had a high coercive force such as of the order of 1.8 KOe, it was required to reduce its thickness, resulting in difficulty in manufacturing and further resulting in only a small starting torque.

In order to overcome these defects the inventors have newly developed so-called sheet-shaped flexible plastic magnetic materials. These magnetic materials are high performance magnets having an easy direction for magnetization in the direction of the sheet thickness. Further, these plastic magnetic materials have stronger anisotropy than those magnetic materials conventionally referred to as rubber magnetic materials and also, since they have a knee point on their hysteresis loop in the second quadrant of the B-H diagram, the area surrounded by the hysteresis loop is large in comparison with the exciting force. The rotor according to the present invention is characterized in the application of these sheet-like flexible plastic magnetic materials as materials for a rotor of a hysteresis motor.

Figure 1:
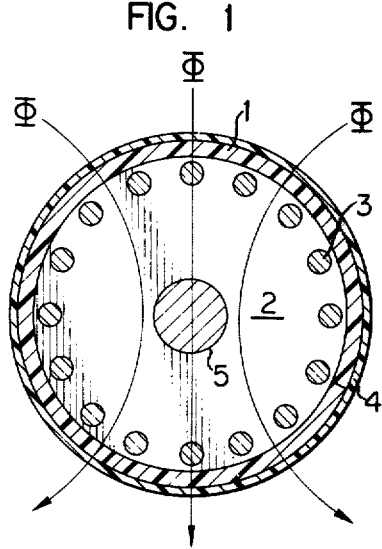
FIG. 1 is a diagrammatical transverse sectional view of one embodiment of the present invention.

Referring now to FIG. 1 of the drawings, a sheet-like flexible plastic magnetic material 1 which is anisotropic in the direction of the sheet thickness as abovementioned is wound, without being magnetized, around the outer periphery of a cylindrical laminated iron core 5 2 having a cage winding 3 to be fixedly secured thereto. Further, coated on the outer periphery of the sheet-like flexible plastic magnetic material 1 is a filler adhesive 4 comprising a mixture of powders having high magnetic permeability such as iron powders and synthetic resins, which mixture is sometimes also called a plastic metal, to about several tenths of a mm in thickness. The rotor so manufactured becomes mechanically strengthened and has a good machinability thanks to the plastic metal. Further, when the rotor is assembled as the hysteresis motor, since the coated plastic metal is of soft magnetic material such as iron powder and the filler adhesives are of insulating materials, the hysteresis loss due to the minor loop caused by the slots of the stator and the eddy current loss due to local eddy currents do not occur and the consumption of the magnetomotive force is small in comparison with non-magnetic materials. At the same time the efficiency of the hysteresis motor can be remarkably increased owing to the effect of smoothening the harmonic waves. Moreover the starting torque of the motor can be increased by utilizing the inductive force due to the cage winding.

Figure 2:
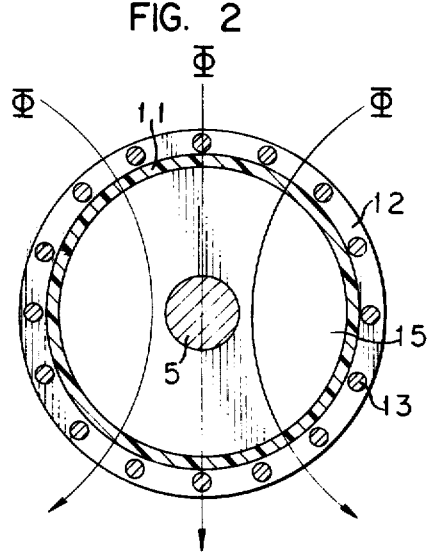
FIG. 2 is a diagrammatical transverse sectional view of another embodiment of the present invention.

FIG. 2 shows another embodiment of the present invention in which on the outer periphery of a cylindrical laminated core 15 of silicon steel plates, is fixedly secured a sheet-like flexible plastic magnetic material 11, which is anisotropic in the direction of the sheet thickness as in the first embodiment, to about several tenths of a mm in thickness, without being magnetized. Secured on the outer surface of the sheet-like flexible plastic material 11 is a hollow cylindrical laminated core 12 of silicon steel plates having a cage winding 13. In FIGS. 1 and 2 reference numeral 5 shows a rotor shaft secured to also the core 2 or 15 at its center. In the embodiment shown in FIG. 2, the hysteresis loss due to the minor loop and the eddy current loss due to local eddy currents can be eliminated by the use of silicon steel plates as the laminated iron core 15. Accordingly, the hysteresis motor using the rotor shown in FIG. 2 has similarly a good efficiency by utilization of the synchronous torque due to the main loop of the sheet-like flexible plastic magnetic material 11 and the inductive torque due to the fundamental wave inductive current based on the cage winding 13. Further, in this embodiment the hollow laminated iron core 12 with the cage winding 13 effectively protects the coating of the sheet-like flexible plastic magnetic material 11 on the outer periphery of cylindrical core 15.

In the first and second embodiments, the mechanical weakness of the sheet-like flexible plastic magnetic materials 1 or 11 can be reinforced by fixedly securing at both ends respectively a ring made of nonmagnetic materials such as aluminum alloys, bakelite, etc.

Figure 3:
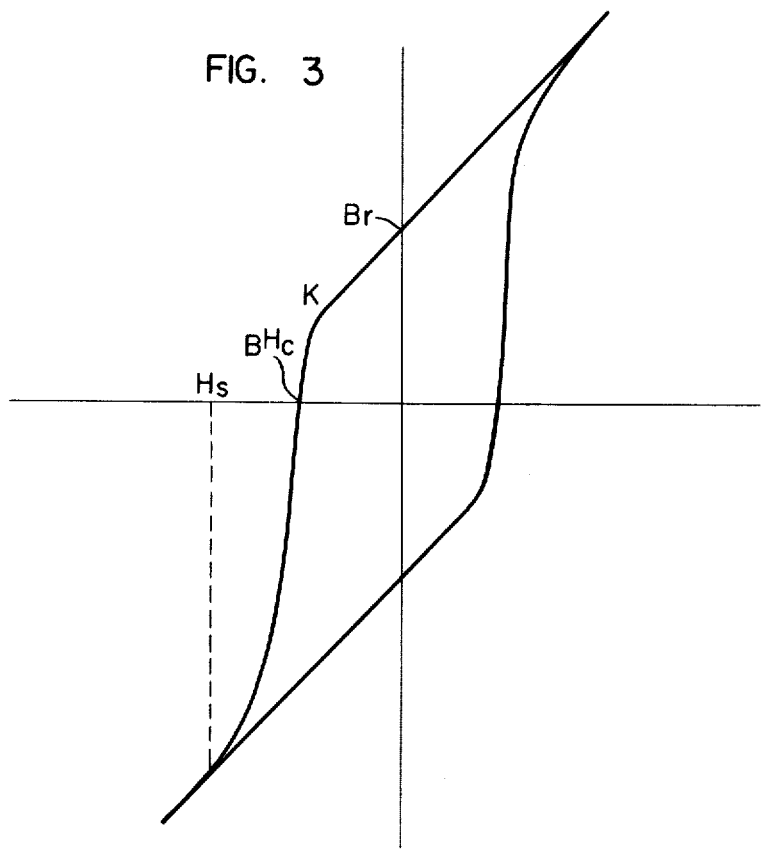
FIG. 3 is a typical hysteresis loop for the sheet-like flexible plastic magnetic material used in association with the present invention drawn as a B-H diagram.

It should also be noticed that, in the present invention, the sheet-like flexible plastic magnetic materials 1 or 11 should have the following magnetic properties for the hysteresis loop represented in the B-H diagram at points as shown in FIG. 3 and at the same time the knee point of the hysteresis loop shown at K in FIG. 3 should lie in its second quadrant:

| | | |
|---|---|---|
| | Residual magnetic flux Density Br | above 2.2 KOe |
| | Coercive force $_BH_c$ | above 1.2 KOe |
| M | Magnetic energy product (BH)max | above 1.1 KOe |
| | Minimum intensity of magnetic field necessary for saturation Hs | below 4 KOe |

In the rotor according to the present invention, as shown in FIGS. 1 and 2, the magnetic flux mainly traverses the body of the iron core 2 or 15. Thus it will be appreciated that in these rotors the parts which contribute to generating the snychronous torque are mainly the parts of the anisotropic sheet-like flexible plastic magnetic materials 1 or 11, while the parts which contribute to generating the starting torque are mainly the cage windings 3 or 13. Therefore, according to the present invention a synchronous or hysteresis motor having a good efficiency can be obtained at a relatively low price, that can separately increase the snychronous torque and the starting torque as desired owing to the specific construction of its rotor. Further the experiments showed that, though a rotor having a similar construction but using flexible magnetic materials such as so-called rubber magnets in place of the sheet-like flexible plastic magnetic materials of the present invention showed only very poor characteristics as a hysteresis motor, the rotor according to the present invention exhibited satisfactory characteristics as a hysteresis motor. And yet the experiments showed also that the magnetic properties of the sheet-like flexible magnetic materials as above-mentioned used in a association with the present invention are indispensable for the constitution as will become more apparent later upon taking into consideration the examples of the present invention, which are described as follows:

Example 1

85 to 90 weight percentage of fine particles (average grain diameter being about 2 $\mu$) of strontium ferrite which have a distinct knee point K in the second quadrant of the hysteresis loop as shown in FIG. 3 and 10 to 15 weight percentage of plastic mixture, mainly comprising chlorinated polyethylene with the addition of plasticizer, stabilizer and lubricant were throughly kneaded together at an elevated temperature. The mixture thus kneaded was subsequently subjected to a cold rolling and a thermal magnetic field treatment to produces a 1 mm thickness sheet-like plastic magnetic material. In this case, the easy direction for magnetization was the thickness direction of the sheet-like plastic magnet material and it was confirmed that its magnetic properties fell within the specific ranges given above. The rotors constituted using this sheet-like flexible plastic magnetic material had an outer diameter of 23.7 mm for the construction shown in FIG. 1 (this being referred to as rotor A) and an outer diameter of 23.7 mm for the construction shown in FIG. 2 (this being referred to as rotor B). Of course, both rotors A and B have applied the 1 mm thickness sheet-like flexible plastic magnetic material, that is, an anisotropic sheet-like flexible hysteresis magnetic material.

The results of the experiments which were conducted by substituting respectively rotors A and B for conducted by substituting a conventional rotor made of an alnico base isotropic hysteresis material having the same outer diameter of a hysteresis motor are shown in Table 1.

Table 1

| Items | Starting Torque (g-cm) | Synchronous Torque (g-cm) | Temperature Rise (°C) |
| --- | --- | --- | --- |
| Rotor A | 90 | 90 | 35 |
| Rotor B | 80 | 70 | 35 |
| Conventional Rotor | 60 | 50 | 35 |

As apparent from Table 1, the properties of the hysteresis motor are remarkably increased merely by utilizing the rotors according to the present invention as its rotor without necessitating any special design for its stator.

Example 2

In the rotor A, having superior effects on a hysteresis motor to the rotor B as shown in Example 1, the sheet-like flexible magnetic material was substituted by the following hysteresis materials:

1. a hysteresis material which had a distinct knee point K in its hysteresis loop in the second quadrant of the B-H diagram and the following magnetic properties:

| | | |
| --- | --- | --- |
| Br | 2.1 | KG |
| $_BH_c$ | 1.2 | KOe |
| (BH)max | 0.95 | MGOe |
| Hs | 3.5 | KOe |

(the rotor using this hysteresis material being referred to as rotor C);

2. a hysteresis material which had no knee point K in its hysteresis loop in the second quadrant of the B-H diagram but which had the following magnetic properties:

| | | |
| --- | --- | --- |
| Br | 2.6 | KG |
| $_BH_c$ | 2.05 | KOe |
| (BH)max | 1.49 | MGOe |
| Hs | 5.4 | KOe |

(the rotor using this hysteresis material being referred to as rotor D); and 3. a hysteresis material which had no knee point in its hysteresis loop in the second quadrant of the B-H diagram but which had the following magnetic properties:

| | | |
| --- | --- | --- |
| Br | 1.65 | KG |
| $_BH_c$ | 1.17 | KOe |
| (BH)max | 0.55 | MGOe |
| Hs | 4.4 | KOe |

(the rotor using this hysteresis material being referred to as rotor E).

The results of the experiments, which were conducted in reference to the same hysteresis motor as in Example 1 are shown in Table 2.

Table 2

| Items | Starting Torque (g-cm) | Synchronous Torque (g-cm) | Temperature Rise (°C) |
| --- | --- | --- | --- |
| Rotor C | 70 | 35 | 35 |
| Rotor D | 60 | 20 | 35 |
| Rotor E | 35 | 15 | 35 |

Table will be apparent from TAble 2, the hysteresis materials to be used in association with the present invention remarkably decrease the torque characteristics of a hysteresis motor if either, though they have the knee point in the hysteresis loop in the second quadrant of the B-H diagram, their magnetic properties are out of the specific ranges as abovementioned (e.g., in the case of the rotor C), or, though the magnetic properties fall under the specific ranges of the present invention excepting Hs, the knee point K in the hysteresis loop does not lie in the second quadrant of the B-H diagram (e.g., in the case of the rotor D), or none of the magnetic properties falls under the specific ranges as above-mentioned (e.g., in the case of the rotor E). Thus it will be appreciated that the magnetic characteristics such as above-mentioned of the sheet-like flexible plastic magnetic materials of the present invention are indispensable conditions for the constitution of the present invention.

Though the present invention has been described and shown as being embodied as a rotor for an axial exciting hysteresis motor of the type having an inner rotational rotor it can be similarly embodied as a rotor for an axial hysteresis motor of the type having an outer rotational rotor.

While we describe and illustrate herein certain preferred embodiments of our invention it will be understood that modifications and changes may be made without departing from the spirit of our invention.

What is claimed is:

1. A rotor for a hysteresis motor comprising a cylindrical laminated core of silicon steel plates having a cage winding, a sheet-like flexible plastic magnetic material secured to the outer periphery of said core without being magnetized and a coating of a filler adhesive fixedly secured to the outer periphery of said sheet-like flexible plastic magnetic material, said sheet-like flexible plastic magnetic material being anisotropic in the thickness direction of the sheet and having such magnetic properties as not less than 2.2 KG residual magnetic flux density Br, not less than 1.2 KOe coercive force $_BH_c$ and not less than 1.1 MGOe maximum magnetic energy product (BH)max and not greater than 4 KOe minimum intensity of magnetic field necessary for saturation Hs, said sheet-like flexible plastic magnetic material further having a knee point in its hysteresis loop located in the second quadrant of the B-H diagram, said coating of a filler adhesive comprising the powders of materials having high magnetic permeability such as iron, and synthetic resins.

2. A rotor for a hysteresis motor comprising a cylindrical laminated core of silicon steel plates, a sheet-like flexible plastic magnetic material secured to the outer periphery of said core without being magnetized and a hollow cylindrical laminated core of silicon steel plates fixedly secured to the outer periphery of said sheet-like flexible plastic magnetic material with a cage winding, said sheet-like flexible plastic magnetic material being anisotropic in the thickness direction of the sheet and having such magnetic properties as not less than 1.2 KG residual magnetic flux density Br, not less than 1.2 $KO_e$ coercive force $_BH_c$ and not less than 1.1 $MGO_e$ maximum magnetic energy product (BH)max and not greater than 4 $KO_e$ minimum intensity of magnetic field necessary for saturation $H_S$, said sheet-like flexible plastic magnetic material further having a knee point in its hysteresis loop located in the second quadrant of the B-H diagram.

* * * * *